Jan. 1, 1957 D. B. PECK 2,776,235
ELECTRIC CIRCUIT PRINTING
Filed Sept. 18, 1952 2 Sheets-Sheet 1
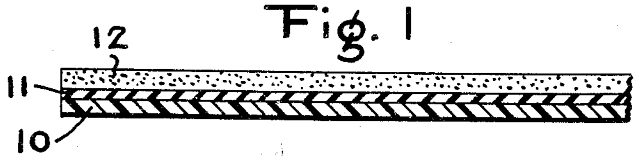
Fig. 1
Fig. 2
Fig. 3A
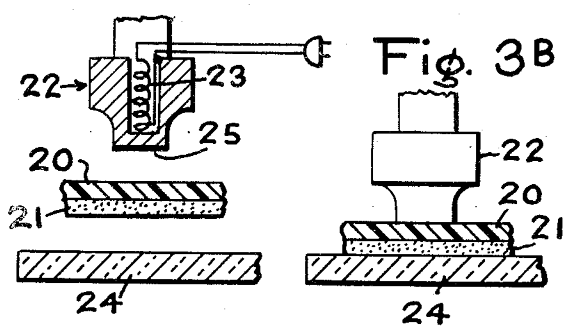
Fig. 3A, Fig. 3B
Fig. 3C
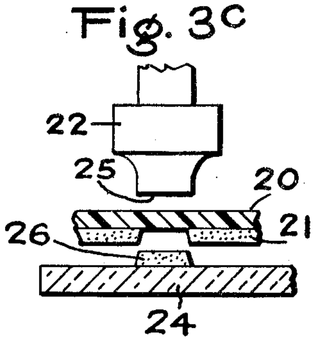
INVENTOR.
DAVID B. PECK
BY Connolly and Hutz
HIS ATTORNEYS Jan. 1, 1957 D. B. PECK 2,776,235

ELECTRIC CIRCUIT PRINTING

Filed Sept. 18, 1952 2 Sheets-Sheet 2

INVENTOR.
DAVID B. PECK
BY
Connolly and Hutz
HIS ATTORNEYS

United States Patent Office 2,776,235
Patented Jan. 1, 1957

2,776,235

ELECTRIC CIRCUIT PRINTING

David B. Peck, Williamstown, Mass., assignor to Sprague Electric Company, North Adams, Mass., a corporation of Massachusetts Application September 18, 1952, Serial No. 310,182

3 Claims. (Cl. 154—95)

This invention relates to electrical circuits and circuit portions, more specifically to processes for making such circuits by applying them on base elements using a printing technique.

In the past many attempts have been made to use printing techniques for the commercial preparation of electric circuits. However, these attempts have not been too successful by reason of the fact that they have introduced appreciable variation in the characteristics of the circuit portions that can be deposited by a printing step. By way of example, in the application of a resistive film, it has been found that the variation in resistance in successive films printed by the same technique can be as high as plus or minus 50% or more.

Among the objects of the present invention is the overcoming of the above and related disadvantages. Further objects of the invention include the provision of novel processes and the application of electric circuit portions with a very high order of reproducibility.

The above as well as still further objects of the present invention will be more clearly understood from the following description of several of its exemplifications, reference being made to the accompanying drawings wherein:

Fig. 1 is a sectional view of a temporary support carrying a circuit material in accordance with the present invention;

Fig. 2 is a view similar to Fig. 1 of a circuit material carried on a different support according to the present invention;

Figs. 3A, 3B and 3C illustrates steps in the practicing of the present invention;

Figure 4A:
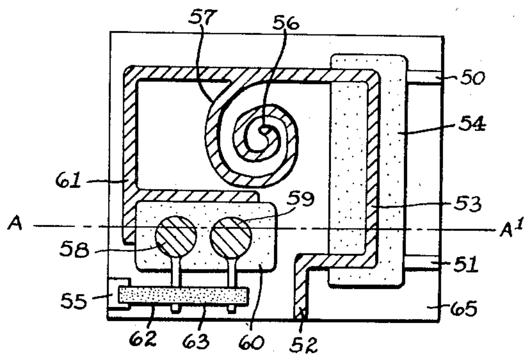
Figure 4B:
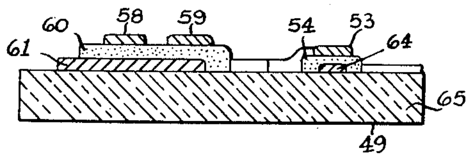
Figure 4C:
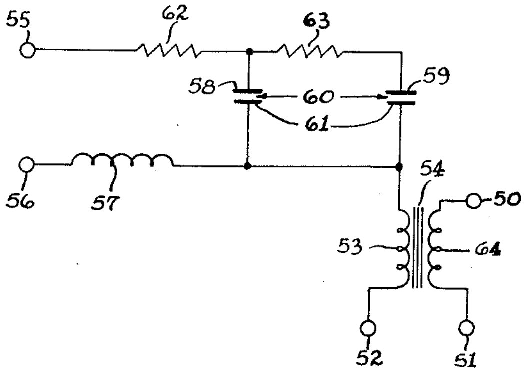

Figs. 4A, 4B, and 4C illustrate a printed circuit produced in accordance with this invention in which Fig. 4A is a pictorial representation of the circuit member, Fig. 4B a cross sectional view through A—A' of Fig. 4A, and Fig. 4C shows the schematic circuit diagram.

According to the present invention an electric circuit section is printed by first applying an adherent but disengageable layer of fusible electric circuit material having uniform characteristics, over an extended area of a temporary support, placing the support layer in contact with the base on which the circuit section is to be mounted and transferring to the base selected portions of the layer by applying a disengaging tool having the shape of the selected portions to the back of the temporary support to disengage these portions of the layer from the temporary support and to cause them to become affixed to the base.

The fusible circuit material can be a mixture of suitable particles of electric circuit ingredients such as particles of highly conductive or resistive materials, or particles of high dielectric constant or high permeability, with a binder that can be organic such as a resin or inorganic such as gelatinous hydrated silica. After the transfer of the circuit portions, the transferred material can be cured as by fusing and/or sintering to anchor the transferred portions in place on the base. Where the desired circuit portions are composed of superimposed layers of different materials, such as conductive and capacitive, or magnetic components, the printing operation can be made as a sequence of transfer steps, in which each step deposits a different one of the layers.

The temporary support according to the present invention has a surface which shows less adhesion to the circuit material than the final base and can be for example a resin, such as polytetrafluoroethylene, a polyester of ethylene glycol with terephthalic acid, a regenerated cellulose, or wax. The surface of the temporary support can also be a readily fusible one so that the layer of circuit material will be readily disengaged where the fusible material is melted. Wax is suitable for this type of temporary support, particularly when it is used as an intermediate layer between the circuit material and a support backing.

The final base upon which the circuit is to be applied, can be of any desired composition such as resin, ceramic, glass, metal and even wood, cloth and paper. Any synthetic or natural resin is suitable, and satisfactory examples include polystyrene, polyethylene, phenol formaldehyde resins, cellulose ethers, cellulose esters, regenerated cellulose, hard rubber, condensation polyesters of ethylene glycol and terephthalic acid, polyacrylonitrile, polymethylmethacrylate, polyvinyl chloride, melamine formaldehyde condensation products, urea formaldehyde condensation products and the like. The resins can be in either unfilled condition, or they can contain fillers of the usual types, such as clay, silica, finely-divided mica and the like. The only requirement is that the base has a greater adhesion for the circuit material than the temporary support. Polytetrafluoroethylene and wax have extremely low adhesion so that when these surfaces are used as temporary supports any of the above base compositions are suitable. However, temporary support surfaces of other resinous materials can also be used so long as the final base has greater adhesion for the coating. Furthermore, the surface of the temporary support, where of the non-fusible type, can also be in the form of a layer held on a suitable backing member.

The disengagement of the circuit material from the temporary support can be effected by fusing the circuit material so that it preferentially adheres to the final base, or the material can be liquefied by other means such as compression vibrations, when the material has thixotropic properties.

It is preferred that the temporary support be relatively thin, so that the pattern of the disengaging tool is more accurately reproduced by the transfer operation. Suitable thicknesses are 10 mils or less, although for the highest accuracy one-half to two mils is preferred. Thicknesses less than a half mil can be used but are subject to inaccuracies by reason of the distortion of such thin films by the required handling.

Referring now to the figures, Fig. 1 shows a temporary support in the form of a backing 10 having a thin layer 11 of thermally sensitive release material, such as wax. On the wax layer is a coating 12 of the electric circuit material. This coating 12 can be very conveniently applied over an extended area of the support, and can be made to have a highly uniform depth as by coating the support with any standard type of uniform coating apparatus having a doctor blade arranged to wipe the coating to spread it in a uniform manner over the support. The coating is preferably applied in semi-liquid form as by arranging for the coating material to have a suitable proportion of solvent or thinner. After the coating 12 is applied, it can be permitted to dry for a short period so that it will harden to some extent and stay in place.

Alternatively, the layer 12 can be spread in semi-liquid form by having it heated to a sufficiently high temperature, which temperature is below that at which the layer 12 fuses.

Fig. 2 shows an alternative form of temporary support in which a backing 20 has a layer 21 of electric circuit material directly applied to it. The application of this layer can be exactly the same as that described in connection with the construction of Fig. 1.

Figs. 3A, 3B and 3C show the successive steps in transferring the electric circuit material from a temporary support as shown in Fig. 2 to the final base. In Fig. 3A the support 20 carrying layer 21, and the final base 24 are shown juxtaposed along with the transfer tool 22 having a patterned surface 25. In this form of the invention the tool 22 is an electrically-heated die, the heating being effected by the heating coil 23 suitably connected. The juxtaposed elements are then brought together as indicated in Fig. 3B with layer 21 against the final base 24, and with the patterned surface of tool 22 against the back of the temporary support 20. After a short while during which time the layer 21 is permitted to become disengaged from temporary support 20, the disengaging tool and support 20 are lifted away from the base 24 leaving the components in the form shown in Fig. 3C. It will there be seen that a portion 26 of layer 21, which portion corresponds in shape to that of the patterned surface 25 of the disengaging tool, adheres to the surface of base 24, while the remainder of the layer 21 is uneffected and remains on the temporary support 20 as it is removed.

The following specific examples illustrate the practice of the invention.

A mixture of 30 parts of finely-divided graphite, 70 parts of an epoxy resin obtained by condensing epichlorhydrin with 1,3 bisphenol propane to give a resin with a melting point of 70° C., and 5 parts of dicyandiamide was thoroughly mixed and then dissolved in a mixture of equal parts of toluene and cellosolve acetate. The solution was applied to a base consisting of a 2 mil film of polytetrafluoroethylene resin to give a layer which upon evaporation of the solvent had a thickness of 2 mils. This layer was transferred to a permanent ceramic base by a pattern die, whose temperature was maintained at 91° C. The resistive coating thus deposited was cured for two hours at 100° C. and four hours at 150° C. to provide stable resistance elements possessing a resistance value of about 1800 ohms when measured between the opposite edges of a square centimeter portion.

As another example, a mixture of 30 parts of powdered silver, 6 parts of potassium lead silicate and 18 parts of carboxymethyl cellulose was dispersed in water to give a thick slurry at 60° C. A cellophane foil 2½ mils thick was coated with this layer and the layer was then cooled at room temperature. A pattern of the layer was transferred to a ceramic base by using as a disengagement tool a piezoelectric vibrator actuated at 20,000 cycles per second with the circuit material held at room temperature. The transferred mass was heated to remove the water and then fired to fuse the conductor layer to the ceramic base leaving a layer that is highly suited for a circuit connection.

Where alkaline earth titanates are used in place of the graphite or silver, accurately reproducible layers of extremely high dielectric constant (upwards of 2000) are obtained. Similar good results follow with circuit elements in the form of particles having high permeability, such as finely-divided iron and the well-known ferrites such as zinc-copper ferrite. In some cases it may be desirable to use binders that are driven off as by firing during the final hardening. This makes it possible to reduce the dilution of the desired electrical characteristics by the binder.

Other circuit materials and binders can be used in place of or together with those referred to above. Suitable conductive particles for conductive links or resistance connections include lead dioxide, conductive oxides such as slightly reduced oxides of cobalt, nickel or titanium, semi-conductive particles such as tellurium, silicon, germanium, etc. For dielectric purposes $TiO_2$ or mica particles are suitable circuit materials. Borates such as lead borate, make suitable binders of the non-removable type. Any fusible resin can be used as an organic binder.

For use in connection with practical manufacturing operations, a temporary support can be in the form of an elongated or endless ribbon that can have a layer of the desired circuit material continuously coated over one of its surfaces. The so coated support can then be continuously fed in stripwise manner into a transfer mechanism where a set of final bases are successively advanced into printing position, and a disengaging tool perpetually operated in synchronism. Where the final bases are to be of a composition such as a resin, which is readily provided to elongated strips, a strip of such a final base material can be sandwiched with the coated temporary support, and the sandwich suitably fed to a disengaging tool that is brought into disengaging position along spaced portions of the elongated sandwich. After disengagement the sandwich is pulled apart and the continuous length of final base having a succession of circuit portions can then be subdivided as by sawing or slitting into a corresponding plurality of individual bases.

If desired, a disengaging tool can be arranged to have a plurality of the same or different contours, each arranged to make a different portion of the desired circuit section. In this way, a single operation of the tool will transfer a corresponding plurality of final coatings on to final bases.

Referring now to Figures 4A, 4B and 4C, a representation of a complete printed circuit is shown in Figure 4A, Figure 4B illustrates the cross sectional view through A—A′ of Figure 4A, and Figure 4C shows the schematic circuit diagram. 65 represents the permanent base upon which is deposited terminals 50, 51 and an inductor, that is, conductive layer 64, respectively. A high permeability inductive coupling layer 54 is deposited on conductor layer 64, and finally, conductor element 53 having terminal 52 is deposited upon the top of layer 54 to form another inductor. Inductor layers 64 and 53 are indicated as parallel straight conductors but are susceptible of other configurations e. g. zig-zag where greater flux linkage is required. Layer 54 consists of a dispersion of ferro-magnetic material such as a ferrite or carbonyl type iron. Inductor element 57 having terminal 56 for external connection is one branch of the continuation of conductor 53 which also extends to provide capacitor electrode base 61. Dielectric layer 60 overlaps electrode 61 and is, in turn, covered with capacitor electrode layers 58 and 59. These electrode elements and terminal element 55 are then joined by a layer having portions 62 and 63 of a resistance formulation. Surface 49 of base 65 could also be used. Although the schematic indicated is only of limited application where phase shifting is desired, it was chosen for discussion as it presents numerous electrical components in a compact unit.

As many apparently widely different embodiments of this invention may be made without departing from the spirit and scope hereof, it is to be understood that the invention is not limited to the specific embodiments hereof except as defined in the appended claims.

What is claimed is:

1. In a process for printing electric circuit sections, the steps of applying an adherent but disengageable layer of liquefiable electric circuit material having uniform electrical characteristics over an extended area of a temporary support of a film of polytetrafluoroethylene resin, placing the supported layer in contact with a base on which the circuit section is to be mounted and for which the liquefied material has greater adhesion, transferring to the base selected portions of the layer by applying a liquefying tool having the shape of the selected portions to the back of the temporary support to liquefy and disengage these portions of the layer from the temporary support and to cause them to become affixed to the base.

2. In a process for printing electric circuit sections, the steps of applying an adherent but disengageable layer of a liquefiable and hardenable electric circuit material having uniform characteristics over an extended area of a temporary support, placing the supported layer in contact with a base on which the circuit section is to be mounted and for which the liquefied circuit material has greater adhesion, transferring to the base selected portions of the layer by applying a liquefying tool having the shape of the selected portions to the back of the temporary support to disengage these portions of the layer from the temporary support and to cause them to become affixed to the base, repeating the above steps with a circuit material having a different electrical characteristic to affix a different portion of the circuit section over the portion affixed first, and hardening the affixed portions.

3. In a process for printing electric circuit sections, the steps of applying an adherent layer of a thixotropic electric circuit material having uniform characteristics over an extended area of a temporary support having a low adhesion for the material, placing the supported layer in contact with a more adherent base on which the circuit section is to be mounted, and transferring to the base selected portions of the layer by applying a vibrating die having the shape of the selected portions to the back of the temporary support to liquefy these portions of the layer and to cause them to become preferentially affixed to the base.

References Cited in the file of this patent

UNITED STATES PATENTS

| | | |
|---|---|---|
| 1,837,678 | Ryder | Dec. 22, 1931 |
| 1,882,593 | Hentschel | Oct. 11, 1932 |
| 1,978,790 | Gould et al. | Oct. 30, 1934 |
| 2,057,696 | Sherman | Oct. 20, 1936 |
| 2,295,080 | Grupe | Sept. 8, 1942 |
| 2,339,199 | Smith | Jan. 11, 1944 |
| 2,384,039 | Miglarese | Sept. 4, 1945 |
| 2,438,205 | Coates | Mar. 23, -948 |
| 2,441,960 | Eisler | May 25, 1948 |
| 2,539,303 | Gerke et al. | Jan. 23, 1951 |
| 2,556,078 | Francis | June 5, 1951 |

FOREIGN PATENTS

| | | |
|---|---|---|
| 672,255 | Great Britain | May 21, 1952 |